United States Patent
King et al.

(10) Patent No.: US 6,822,486 B1
(45) Date of Patent: Nov. 23, 2004

(54) MULTIPLEXER METHODS AND APPARATUS

(75) Inventors: Matthew E. King, Pflugerville, TX (US); Peichun Liu, Austin, TX (US); David Mui, Round Rock, TX (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/635,968

(22) Filed: Aug. 7, 2003

(51) Int. Cl.⁷ ............................................. H03K 17/00
(52) U.S. Cl. ...................................... 327/99; 327/407
(58) Field of Search ........................ 327/99, 407, 408, 327/409, 410, 298, 355

(56) References Cited

U.S. PATENT DOCUMENTS 5,381,421 A * 1/1995 Dickol et al. ............... 714/744
6,556,042 B1 * 4/2003 Kaviani ....................... 326/39

* cited by examiner

Primary Examiner—Linh My Nguyen
(74) Attorney, Agent, or Firm—Dugan & Dugan, PC

(57) ABSTRACT

In a first aspect, a method is provided for selecting a signal from a plurality of signals. The method includes the steps of (1) providing a plurality of multiplexers, each multiplexer configured to selectively output one of a plurality of signals input by the multiplexer using an output of the multiplexer; (2) selecting an input signal from one of the plurality of multiplexers to output; (3) outputting the selected input signal from the output of the one of the plurality of multiplexers; (4) forcing the outputs of the other of the plurality of multiplexers to a predetermined logic state; and (5) combining the outputs of the plurality of multiplexers so as to output the selected input signal. Numerous other aspects are provided.

19 Claims, 3 Drawing Sheets

MULTIPLEXER METHODS AND APPARATUS

FIELD OF THE INVENTION

The present invention relates generally to integrated circuit (IC) design, and more particularly to multiplexer methods and apparatus.

BACKGROUND OF THE INVENTION

Multiplexers are widely used to multiplex signals. For example, microprocessors and digital signal processors may include one or more multiplexers. For lower power applications, static multiplexers are preferred. Although static multiplexers can be built using CMOS gates, a transmission-gate, pass-gate or tristate transistor topology is generally used to create multiplexers that receive a larger number of input signals and provide a better overall performance (e.g., are faster).

FIG. 1 is an exemplary single-level multiplexer system 100 for multiplexing signals. The multiplexer system 100 includes a decoder 102 coupled to a multiplexer 104. Using standard decoding methods, the decoder 102 may receive an n-bit signal via a bus 106, for example, and output $2^n$ select signals. The select signals are input to the multiplexer 104, along with a plurality of data signals ($B_0$–$B_{2^n-1}$).

In a hot select embodiment, the number of select signals may correspond to the number of data signals input to the multiplexer 104; and the select signals output by the decoder 102 include only one signal (or bit) that is of a high logic state. The remaining select signals (or bits) are of a low logic state. Based on the select signals input to the multiplexer 104, the multiplexer 104 outputs one of the data signals $B_0$–$B_{2^n-1}$ input to the multiplexer 104 at an output 108 of the multiplexer. For example, if a two-bit signal is input to the decoder 102, the decoder 102 outputs a 4-bit select signal. The bits of the 4-bit signal are input to the multiplexer 104 as four select signals that allow the multiplexer 104 to select between four data input signals $B_0$–$B_3$. If select signals of "1", "0", "0", "0" are input to the multiplexer 104, the multiplexer 104 outputs the input signal $B_0$ at the output 108. If select signals of 0100 are input to the multiplexer 104, the multiplexer 104 outputs the input signal $B_1$ at the output 108. The signals $B_2$ and $B_3$ may be similarly output via the multiplexer 104. In the first example, the multiplexer 104 creates a logic delay in the path of data signal $B_0$. Likewise, in the second example, the multiplexer 104 creates a logic delay in the path of data signal $B_1$. The logic delay created by a multiplexer 104 is equivalent to the delay created by two logic gate operations.

Although in the above example the multiplexer 104 receives four select signal inputs and four data signal inputs, the multiplexer 104 may be configured to receive a smaller or greater number of select signals and data signals. However, the performance of a single-level multiplexer system degrades as the number of data signals input to a multiplexer is increased. More specifically, due to capacitance effects resulting from the increased number of data signals input to the multiplexer, the switching properties of the multiplexer are affected and overall performance of the multiplexer is degraded.

To avoid the performance degradation associated with the single-level multiplexer system 100 shown in FIG. 1, a multi-level multiplexer system may be used to multiplex a large number of signals. FIG. 2 is an exemplary multi-level multiplexer system 200 for multiplexing signals. The multi-level multiplexer system 200 includes a first decoder circuit 202 coupled to a plurality of multiplexers 204–210. Similar to the decoder 102 of FIG. 1, the first decoder circuit 202 may receive an m-bit signal via a bus 212, for example, and output $2^m$ select signals using standard decoding methods. The $2^m$ select signals are input to each of the multiplexers 204–210, along with a plurality of data signals (e.g., an equal number of data signals at each multiplexer 204–210). The number of select signals may correspond to the number of data signals input to each of the multiplexers 204–210.

Similar to the select signals output by the decoder 102 of FIG. 1, the select signals output by the first decoder circuit 202 of FIG. 2 may include only one signal (or bit) that is a high logic state. The remaining select signals (or bits) are of a low logic state. Based on the select signals input to the multiplexers 204–210, each multiplexer 204–210 outputs one of the plurality of data signals input to that multiplexer. Each multiplexer 204–210 simultaneously selects one input signal to output from the plurality of data signals input to that multiplexer, and outputs the selected signal to a second level multiplexer 212.

As an example, if a two-bit signal is input to the first decoder circuit 202, the first decoder circuit 202 outputs a four-bit signal. The bits of the four-bit signal are input to each of the multiplexers 204–210 as four select signals. Assuming the multiplexers 204–210 receive data signals $A_0$–$A_3$, $B_0$–$B_3$, $C_0$–$C_3$ and $D_0$–$D_3$, respectively, as inputs, select signals of "1", "0", "0", "0" input to each of the multiplexers 204–210 causes the multiplexer 204–210 to output data signals $A_0$, $B_0$, $C_0$, and $D_0$, respectively, to the second level multiplexer 212.

The multi-level multiplexer system 200 includes a second decoder circuit 214 coupled to the second level multiplexer 212. The second decoder circuit 214 may receive an input from an (n−m)-bit signal via a bus 216, for example, and output $2^{(n-m)}$ select signals where the multi-level multiplexer system 200 provides $2^n$ to 1 multiplexing. The $2^{(n-m)}$ signals are input to the second level multiplexer 212 as select signals and the signals (e.g., $A_o$, $B_o$, $C_o$, $D_o$) output from each multiplexer 204–210 in the first-level of the multi-level multiplexer system are input to the second level multiplexer 212 as data signals.

Based on the $2^{(n-m)}$ signals input to the second level multiplexer 212, the multiplexer 212 outputs one of the data signals (e.g., $A_o$, $B_o$, $C_o$, $D_o$) input to the multiplexer 216. For example, if m=2 and n=4, the first and second level of the multi-level multiplexer system to 200 will each provide 4-to-1 multiplexing. The overall system 200 will therefore provide 16-to-1 multiplexing. More specifically, at a first level the system 200 of FIG. 2 provides multiplexing of 16 signals into one signal by first multiplexing each of a plurality of small groups of data signals ($A_0$–$A_2^m{}_{-1}$, $B_0$–$B_2^m{}_{-1}$, $C_0$–$C_2^m{}_{-1}$, $D_0$–$D_2^m{}_{-1}$) in parallel to select one data signal from each of those groups (e.g., $A_o$, $B_o$, $C_o$, $D_o$). These selected signals are input to the second level multiplexer 212. The multiplexer 212 in the second level selects one signal (e.g., $A_o$, $B_o$, $C_o$, $D_o$) from the first level selected signals to output (via an output 220) based on the select signals provided via the second decoder 214.

Although the multi-level multiplexer system 200 provides better performance when a larger number of data signals is to be multiplexed, the system 200 introduces a logic delay in the path of a data signal at both the first and second level of multiplexing. Because the multi-level multiplexer system 200 creates two multiplexer logic delays, the performance (e.g., speed) of the system 200 may not be suitable for many applications. Therefore, methods and apparatus for improved multiplexer systems are desired.

SUMMARY OF THE INVENTION

In a first aspect of the invention, a method is provided for selecting a signal from a plurality of signals. The method includes the steps of (1) providing a plurality of multiplexers, each multiplexer adapted to selectively output one of a plurality of signals input by the multiplexer using an output of the multiplexer; (2) selecting an input signal from one of the plurality of multiplexers to output; (3) outputting the selected input signal from the output of the one of the plurality of multiplexers; (4) forcing the outputs of the other of the plurality of multiplexers to a predetermined logic state; and (5) combining the outputs of the plurality of multiplexers so as to output the selected input signal.

In a second aspect of the invention, a multiplexer circuit is provided that is adapted to select a signal from a plurality of signals. The multiplexer circuit comprises a plurality of multiplexers, each multiplexer adapted to selectively output one of a plurality of signals input by the multiplexer using an output of the multiplexer. The multiplexer circuit also includes (1) a first decoder circuit coupled to the plurality of multiplexers and adapted to generate a plurality of select signals to select an input signal from one of the plurality of multiplexers to output; and (2) a second decoder circuit coupled to the plurality of multiplexers and adapted to generate a plurality of activation signals to force the outputs of the other of the plurality of multiplexers to a predetermined logic state. The multiplexer circuit further includes a logic circuit coupled to the plurality of multiplexers and adapted to combine the outputs of the plurality of multiplexers so as to output the selected input signal. Numerous other aspects are provided.

Other features and aspects of the present invention will become more fully apparent from the following detailed description, the appended claims and the accompanying drawings.

DETAILED DESCRIPTION

Figure 1:
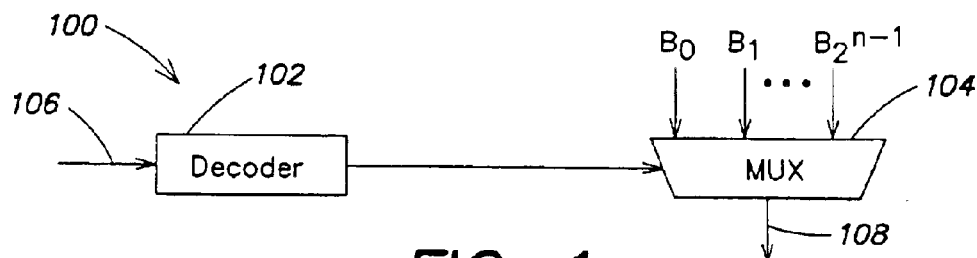
FIG. 1 is a schematic diagram of a conventional single-level multiplexer system for multiplexing signals.
Figure 2:
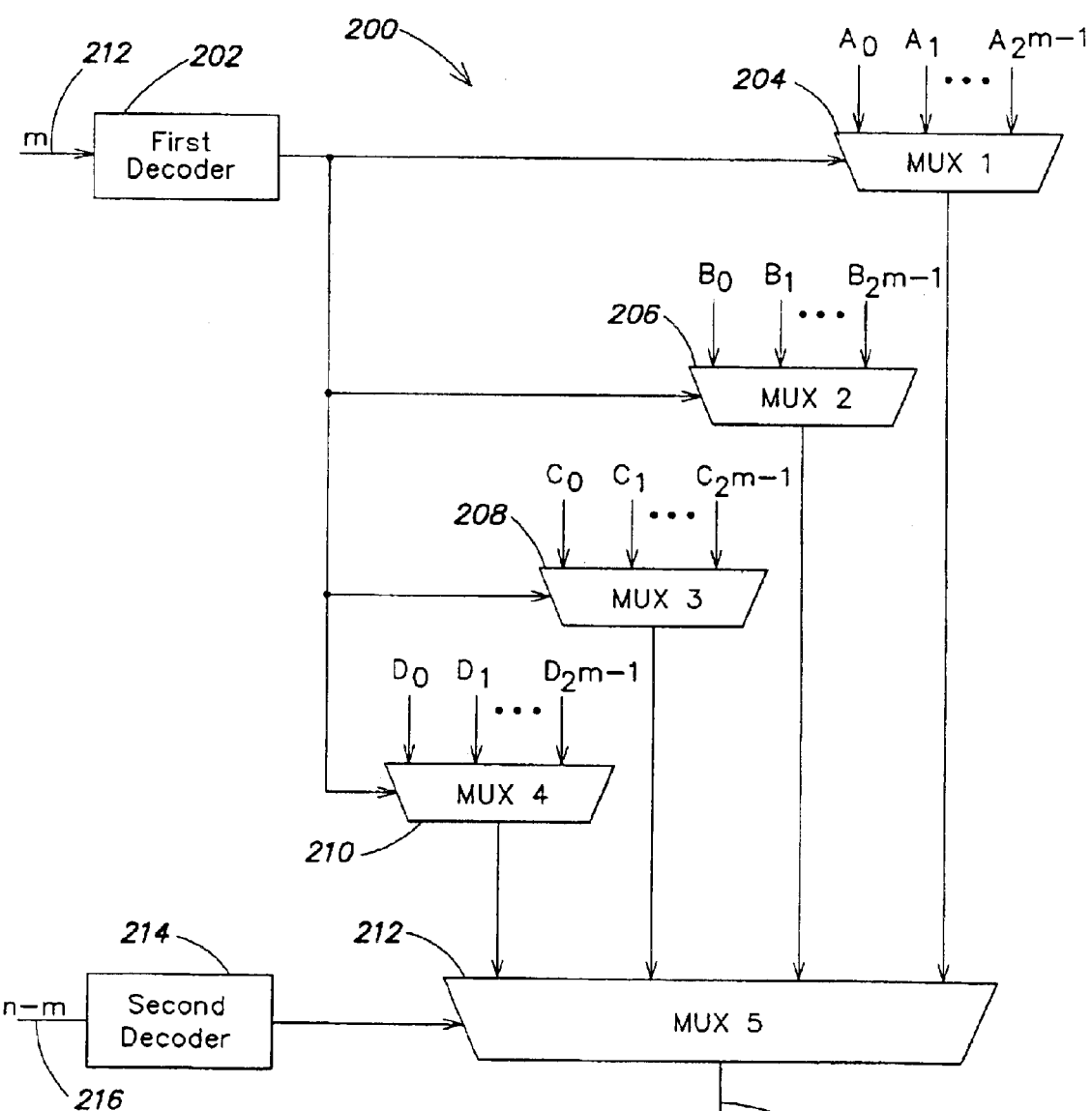
FIG. 2 is a schematic diagram of a conventional multi-level multiplexer system for multiplexing signals.
Figure 3:
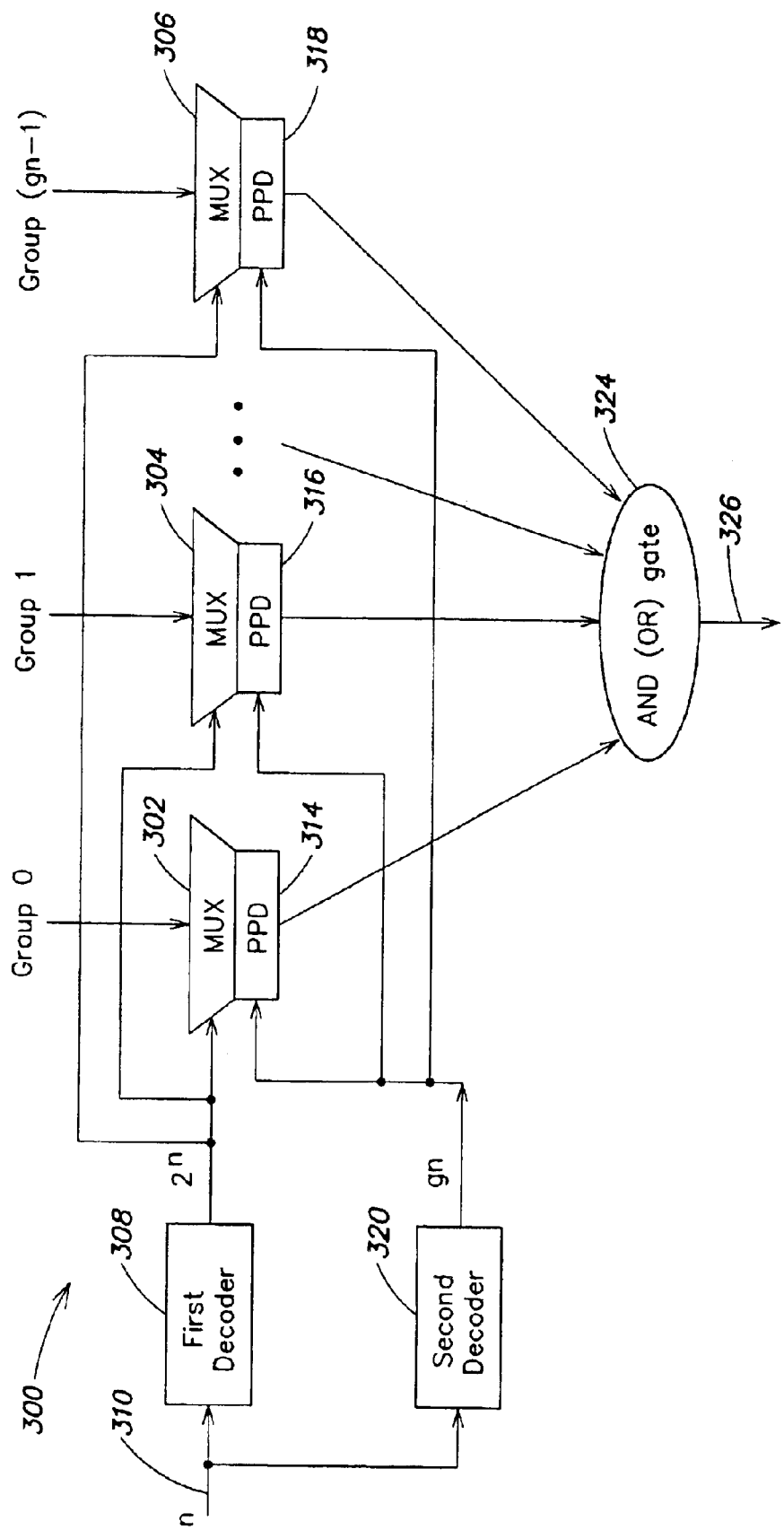
FIG. 3 is a block diagram of an exemplary multiplexer system for multiplexing signals in accordance with the present invention.

FIG. 3 is a block diagram of an exemplary multiplexer system 300 for multiplexing signals in accordance with the present invention. The multiplexer system 300 may include a plurality of multiplexers 302–306 each of which is coupled in parallel to a first decoder circuit 308. Fewer or more than three multiplexers may be employed.

Each multiplexer 302–306 is adapted to selectively output one of a plurality of signals (e.g., data signals) input by the multiplexer 302–306 using an output of the multiplexer 302–306. As shown in FIG. 3, a different group of data signals (e.g., group 0, group 1, or group $g_n-1$) may be input to each of the plurality of multiplexers 302–306, respectively, in the multiplexer system 300. Each group of data signals may include the same or a different number of data signals.

The first decoder circuit 308 is adapted to receive a plurality of decoder input signals via a bus 310, for example, and generate and output a plurality of select signals based on the decoder input signals. For example, the first decoder circuit 308 may receive n input signals and generate and output $2^n$ signals that may be used as select signals by the multiplexers 302–306. More specifically, a unique portion of the select signals may be provided to each of the plurality of multiplexers 302–306 (as described further below). Based on the select signals input to the plurality of multiplexers 302–306, one multiplexer of the plurality of multiplexers 302–306 outputs one of the data signals input to that multiplexer.

Each of the plurality of multiplexers 302—306 may include a pull-up/pull-down (PPD) circuit 314—318 (e.g., one or more pull-up and/or pull-down transistors), respectively. When activated in a pull-up mode, a PPD circuit 314–318 may force the output of a multiplexer 302–306 to a high logic state. Alternatively, when activated in a pull-down mode a PPD circuit 314–318 may force the output of a multiplexer 302–306 to a low logic state. In general each PPD circuit 314–318 may be a pull-up circuit, a pull-down circuit or both a pull-up and pull-down circuit. Each of the plurality of PPD circuits 314–318 may be coupled in parallel to an output of a second decoder circuit 320.

The second decoder circuit 320 is adapted to force all but one of the outputs of the multiplexers 302–306 to a predetermined logic state. More specifically, the second decoder circuit 320 may receive a plurality of decoder input signals via the bus 310, for example, and generate and output one or more activation signals to the PPD circuits 314–318. In one embodiment, the second decoder circuit 320 receives an n-signal input and generates and outputs gn signals (e.g., the number of groups of signals provided to the multiplexer system 300 and/or the number of multiplexers included in the multiplexer system 300). Other numbers of signals may be input to and/or output from the second decoder circuit 320.

One or more of the activation signals may be input to the PPD circuit 314–318 of one or more of the multiplexers 302–306. For example, a different one of the generated activation signals may be input to each of the PPD circuits 314–318. As will be described further below, based on the value of an activation signal input to a PPD circuit 314–318 of a multiplexer 302–306, the output of the multiplexer 302–306 will either (1) output the data signal input to the multiplexer and selected via the selection signals provided to the multiplexer by the first decoder 308; or (2) be forced to a predetermined logic state (e.g., a high logic state if the PPD circuits 314–318 are pull-up circuits or a low logic state if the PPD circuits 314–318 are pull-down circuits).

As further shown in FIG. 3, the output of each multiplexer 314–318 is coupled to a logic circuit 324. The logic circuit 324 is adapted to perform a logic operation on the outputs of the multiplexers 314–318 so as to combine the outputs of the multiplexers 314–318 into one selected input signal that is output at 326. For example, the logic circuit 324 may perform a logic AND operation (e.g., if the PDD circuits 314–318 are pull-up circuits) or a logic OR operation (e.g., if the PDD circuits are pull-down circuits). The operation of the multiplexer system 300 is now described with reference to FIG. 3, and with reference to FIG. 4 which illustrates an exemplary method of selecting a signal from a plurality of signals using the multiplexer system 300 With reference to FIG. 4, in step 402, the method 400 begins. In step 404, an input signal from one of the plurality of multiplexers is selected to be output. More specifically, the first decoder circuit 308 of the multiplexer system 300 generates a plurality of select signals and provides one or more portions of the select signals to each of the plurality of multiplexers 302–306. In one embodiment, the first decoder circuit 308 may generate a plurality of select signals and input a unique portion of the select signals to each of the plurality of multiplexers 302–306. In one particular embodiment, the select signals generated by the first decoder circuit 308 may include only one select signal of a high logic state. The remaining select signals may be of a low logic state.

As an example, if the first decoder circuit 308 receives an n-signal input, and generates and outputs $2^n$ signals, only one of the $2^n$ signals may be of a high logic state (e.g., a logic "1"). The remaining $2^n-1$ signals are of a low logic state (e.g., a logic "0"). The $2^n$ signals generated and output by the first decoder circuit 308 are used as select signals by the multiplexer system 300. More specifically, a unique portion of the $2^n$ select signals is provided to each of the plurality of multiplexers 302–306. For example, the number of select signals provided to each of the plurality of multiplexers 302–306 may correspond to a number of data input signals in a group (e.g., group 0, group 1, group gn-1, etc.) of signals input by the multiplexer. Preferably, the number of input signals in each group is small enough so that each of the plurality of the multiplexers 302–306 exhibits good performance and does not suffer from capacitance induced performance degradations associated with larger numbers of data input signals).

As another example, assume the multiplexer system 300 includes two multiplexers 302, 304 each of which receives eight data input signals. The multiplexer 302 receives a group (e.g., group 0) of eight signals $A_0$–$A_7$ as data input signals and the multiplexer 304 receives a group (e.g., group 1) of eight signals $B_0$–$B_7$ as data input signals. As described above, the first decoder circuit 308 may generate and output sixteen select signals. For example, the first decoder circuit 308 may generate and output the select signals "1000 0000 0000 0000". The first eight select signals (e.g., "1000 0000") may be input to the multiplexer 302. The second eight select signals (e.g., "0000 0000") may be input to the multiplexer 304.

When select signals "1000 0000" are input to the multiplexer 302, the multiplexer 302 selects one of the data input signals from group 0 to be output, for example, $A_0$. Because none of the second eight select signals (0000 0000) are of a high logic state, when the second eight select signals "0000 0000" are input by the multiplexer 304, no input signal from the plurality of data signals $B_0$–$B_7$ input to the multiplexer 304 is selected to be output. Consequently, the output of the multiplexer 304 is floating (e.g., of an indefinite logic state).

In step 406, the selected data input signal from one of the plurality of multiplexers 302–306 is output. In the example because one of the data signals (e.g., $A_0$) input by the multiplexer 302 is selected, the multiplexer 302 will output the selected input signal, $A_0$. More specifically, signal $A_0$ will be provided at the output of the multiplexer 302.

In step 408, the output of each of the other multiplexers that do not output a data input signal is forced to a predetermined logic state. More specifically, the second decoder circuit 320 generates a plurality of activation signals that activate the PDD circuits 314–318 of the multiplexers that do not output a data input signal so as to force the output of the multiplexers to a predetermined logic state. The PDD circuit 314–318 of the multiplexer that outputs a data input signal is not activated, and the multiplexer functions normally and outputs the selected data input signal.

As an example, assume the second decoder circuit 320 receives an n-signal input, and generates and outputs gn signals. (The first decoder circuit 308 and the second decoder circuit 320 may receive the same n-signal input and operate in parallel). As stated, the number gn of signals generated and output by the second decoder circuit 320 may correspond to the number of multiplexers 302–306. In one embodiment, only one of the gn signals generated and output by the second decoder circuit 320 is of a high logic state (e.g., a logic "1"). The remaining gn–1 signals are of a low logic state (e.g., a logic "0"). As mentioned above, the gn signals generated and output by the second decoder circuit 320 are used as activation signals by the multiplexer system 300 and a different activation signal is provided to each PDD circuit 314–316. In the embodiment above, a high logic state activation signal deactivates a PDD circuit 314–316 of a multiplexer 302–306 and allows the multiplexer to operate normally. In contrast, a low logic state activation signal activates a PDD circuit 314–316 of a multiplexer 302–306 and pulls the output of the multiplexer either high or low (depending whether pull-up or pull-down circuitry is employed). For example, if the activation signal having the high logic state is provided to the multiplexer 302, the activation signal will not activate the PPD device 314 included in the multiplexer 302. The multiplexer 302 will therefore, output one of the data signals (e.g., $A_0$) input by the multiplexer 302. An opposite activation polarity may be employed.

It should be noted that each of steps 404, 406, and 408 may be performed on the multiplexers 302–306 in parallel. Additionally, steps 404, 406, and 408 may be performed in parallel.

In step 410, the outputs of the plurality of multiplexers 302–306 are combined to output the selected input signal. More specifically, the multiplexer system 300 employs either a logic AND operation or a logic OR operation (via the logic circuit 324) to combine the outputs of the plurality of multiplexers 302–304 and output the result. For example, if the PDD circuits 314–318 pull the outputs of the multiplexers 302–306 high when activated, a logic AND operation is performed by the logic circuit 324. Likewise, if the PDD circuits 314–318 pull the outputs of the multiplexers 302–306 low when activated, a logic OR operation is performed by the logic circuit 324. In this manner, only the selected data input signal is output by the logic circuit 324. For example, if the logic circuit 324 receives the selected input signal $A_0$ from the multiplexer 302 as a first input and a high logic state signal (e.g., a logic "1") from the other multiplexers 304–306 other inputs, and performs a logic AND operation on these input signals, the result will be the selected input signal ($A_0 \cdot 1 = A_0$). In step 412, the method 400 ends.

Figure 4:
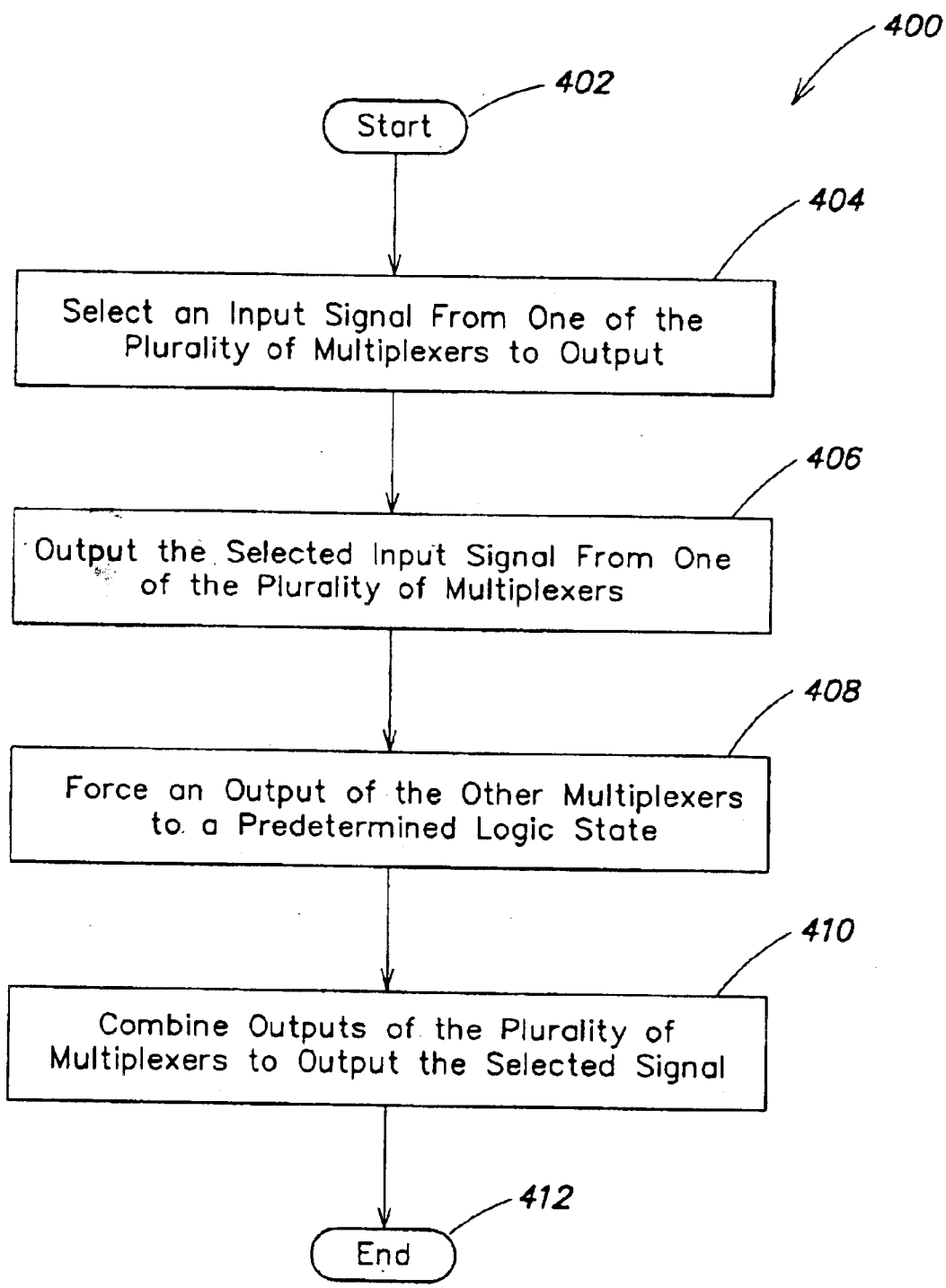
FIG. 4 illustrates an exemplary method of selecting a signal from a plurality of signals using the multiplexer system of FIG. 3.

Through the use of the method 400 of FIG. 4 and the multiplexer circuit 300, one signal may be selected from a plurality of signals using one level of multiplexing (e.g., via the first decoder circuit 308 and second decoder circuit 320, a plurality of multiplexers 302–306, the PDD circuits 314–318 and one logic operation (e.g., via the logic circuit 324). The multiplexing system 300 may introduce a logic delay in the data path of a data signal at the one level of multiplexing and the one level of logic operation. As mentioned above, the logic delay created by a multiplexer is equivalent to the delay created by two logic gate operations. Consequently, the novel multiplexer circuit 300 introduces the equivalent of three logic gate operations in the data path of a selected input signal (e.g., $A_0$). Therefore, the present methods and apparatus may multiplex a plurality of signals without the performance degradation experienced when a large number of signals are input to a single-level multiplexer system 100 and without the logic delays of a multi-level multiplexer system 200 that uses multiple levels of multiplexers to select signals (e.g. resulting in a faster multiplexer circuit).

The foregoing description discloses only exemplary embodiments of the invention. Modifications of the above-disclosed apparatus and methods, which fall within the scope of the invention, will be readily apparent to those of ordinary skill in the art. For instance although in the above example each of the plurality of multiplexers 302–306 receives an equal number of data input signals, the number of data input signals received by each of the plurality of multiplexers 302–306 may vary. The number of select signals input to each of the plurality of multiplexers 302–306 may be adjusted to correspond to the number of data signals input to each multiplexer 302–306. Additionally, although in the example above, the one level of multiplexing provides 8-to-1 multiplexing and the one level of logic operation essentially provides 2-to-1 multiplexing, the amount of multiplexing provided by the one level of multiplexing and/or the one level of logic operation may vary. Further, although in the example above, an activation signal of a low logic state is used to activate a pull-up (or pull-down) circuit included in each of the plurality of multiplexers, an activation signal of a high logic state may be used to activate the pull-up (or pull-down) circuits. A data signal may comprise any type of signal (e.g., a clock signal, a control signal, any other information containing signal, or the like).

Accordingly, while the present invention has been disclosed in connection with exemplary embodiments thereof, it should be understood that other embodiments may fall within the spirit and scope of the invention as defined by the following claims.

The invention claimed is:

1. A method of selecting a signal from a plurality of signals comprising:
   providing a plurality of multiplexers, each multiplexer configured to selectively output one of a plurality of input signals input by the multiplexer using an output of the multiplexer;
   selecting an input signal from one of the plurality of multiplexers to output;
   outputting the selected input signal from the output of the one of the plurality of multiplexers;
   forcing the outputs of the other of the plurality of multiplexers to a predetermined logic state; and
   combining the outputs of the plurality of multiplexers so as to output the selected input signal.

2. The method of claim 1 wherein selecting the input signal from one of the plurality of multiplexers to output includes:
   generating a plurality of select signals; and
   providing a unique portion of the select signals to each of the plurality of multiplexers.

3. The method of claim 2 wherein generating the plurality of select signals includes generating selected signals, wherein only one of the select signals is of a high logic state.

4. The method of claim 1 wherein forcing the outputs of the other of the plurality of multiplexers to a predetermined logic state includes:
   generating a plurality of activation signals to activate one of a pull-up circuit and a pull-down circuit in the other of the plurality of multiplexer; and
   forcing the outputs of the other of the plurality of multiplexers to the predetermined logic state using the one of the pull-up circuit and the pull-down circuit.

5. The method of claim 1 wherein outputting the selected input signal from the output of the one of the plurality of multiplexers, and forcing the outputs of the other of the plurality of multiplexers to a predetermined logic state are performed in parallel.

6. The method of claim 1 wherein combining the outputs of the plurality of multiplexers comprises employing one of a logic OR and a logic AND operation to combine the outputs of the plurality of multiplexers.

7. A multiplexer circuit configured to select a signal from a plurality of signals comprising:
   a plurality of multiplexers, each multiplexer configured to selectively output one of a plurality of signals input by the multiplexer using an output of the multiplexer;
   a first decoder circuit coupled to the plurality of multiplexers and configured to generate a plurality of select signals to select an input signal from one of the plurality of multiplexers to output;
   a second decoder circuit coupled to the plurality of multiplexers and configured to generate a plurality of activation signals to force the outputs of the other of the plurality of multiplexers to a predetermined logic state; and
   a logic circuit coupled to the plurality of multiplexers and configured to combine the outputs of the plurality of multiplexers so as to output the selected input signal.

8. The multiplexer circuit of claim 7 wherein each of the plurality of activation signals correspond to a different one of the plurality of multiplexers.

9. The multiplexer circuit of claim 7 wherein the first and second decoder circuits employ a common input to generate the plurality of select signals and the plurality of activation signals.

10. The multiplexer circuit of claim 7 wherein the first and second decoder circuits operate in parallel.

11. The multiplexer circuit of claim 7 wherein the logic circuit is configured to perform an AND operation on the outputs of the plurality of multiplexers.

12. The multiplexer circuit of claim 7 wherein the logic circuit is configured to perform an OR operation on the outputs of the plurality of multiplexers.

13. The multiplexer circuit of claim 7 wherein the first decoder circuit is further configured to output a unique portion of the select signals to each of the plurality of multiplexers.

14. The multiplexer circuit of claim 13 wherein the plurality of select signals and the plurality of input signals input by each of the plurality of multiplexers have an equal number.

15. The multiplexer circuit of claim 7 wherein the first decoder circuit is further configured to generate a plurality of select signals, wherein only one of the plurality of select signals is of a high logic state.

16. The multiplexer circuit of claim 7 wherein each of the plurality of multiplexers includes a pull-up circuit; and
   wherein the second decoder circuit is further configured to:
      generate a plurality of activation signals to activate the pull-up circuits coupled to the other of the plurality of multiplexers; and force the outputs of the other of the plurality of multiplexers to the predetermined logic state using the pull-up circuits coupled to the other of the plurality of multiplexers.

17. The multiplexer circuit of claim 16 wherein the logic circuit is configured to perform an AND operation on the outputs of the plurality of multiplexers.

18. The multiplexer circuit of claim 7 wherein each of the plurality of multiplexers includes a pull-down circuit; and wherein the second decoder circuit is further configured to:

generate a plurality of activation signals to activate the pull-down circuits coupled to the other of the plurality of multiplexers; and force the outputs of the other of the plurality of multiplexers to the predetermined logic state using the pull-down circuits coupled to the other of the plurality of multiplexers.

19. The multiplexer circuit of claim 18 wherein the logic circuit is configured to perform an OR operation on the outputs of the plurality of multiplexers.

* * * * *